(No Model.)

D. R. COTNER.
TRACE CARRIER.

No. 354,967. Patented Dec. 28, 1886.

Witnesses
R. C. Laurier
Sarepta Specht

Inventor,
David R. Cotner
By R. S. & A. P. Lacey Attys

UNITED STATES PATENT OFFICE.

DAVID RODOLPH COTNER, OF BARDWELL, KENTUCKY.

TRACE-CARRIER.

SPECIFICATION forming part of Letters Patent No. 354,967, dated December 28, 1886.

Application filed July 16, 1886. Serial No. 208,473. (No model.)

*To all whom it may concern:*

Be it known that I, DAVID RODOLPH COTNER, a citizen of the United States, residing at Bardwell, in the county of Carlisle and State of Kentucky, have invented certain new and useful Improvements in Trace-Carriers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a device for supporting the traces and preventing their swinging, which is so common, and which chafes and galls the animal, thereby producing sores.

The object is to simplify and improve the construction of this class of devices—to devise a construction, in short, which will be simple, compact in arrangement, economical in cost, easy to manage, efficient in use, durable, and not liable to get out of repair.

With these ends in view I have devised the simple and novel construction which I will now describe, referring by letters to the accompanying drawings, forming part of this specification, in which—

Figure 1:
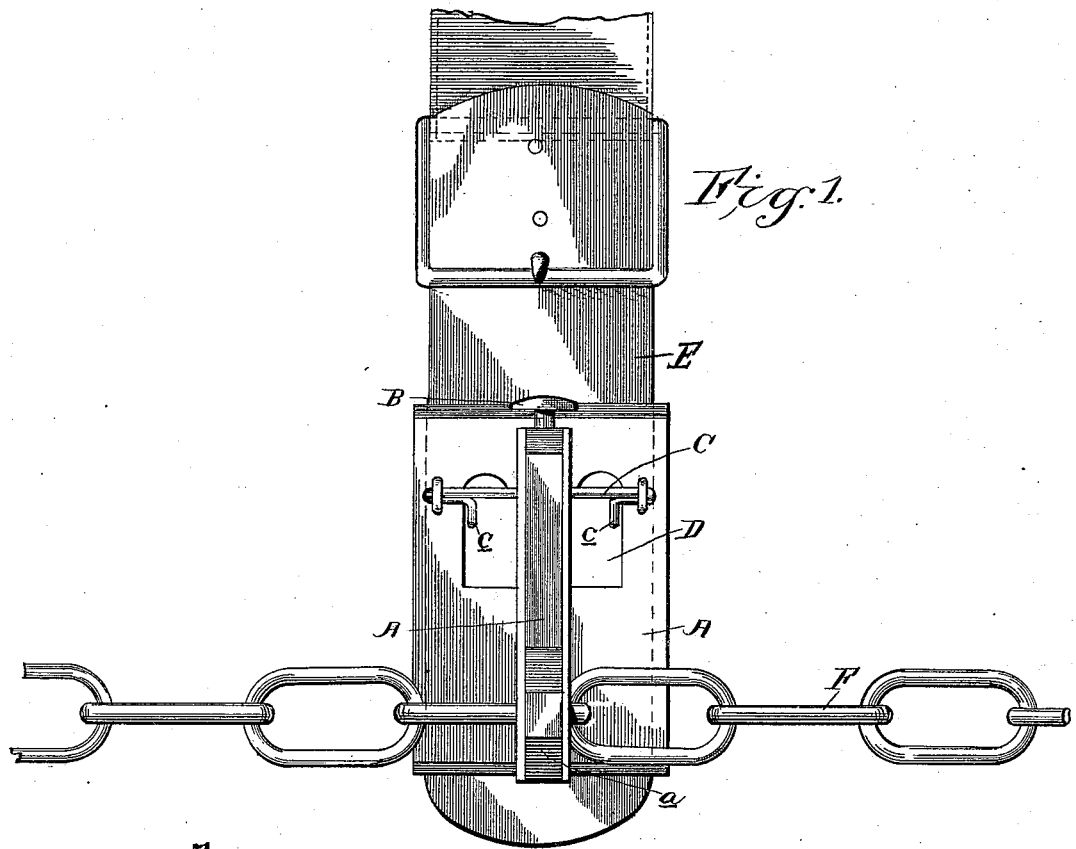
Figure 2:
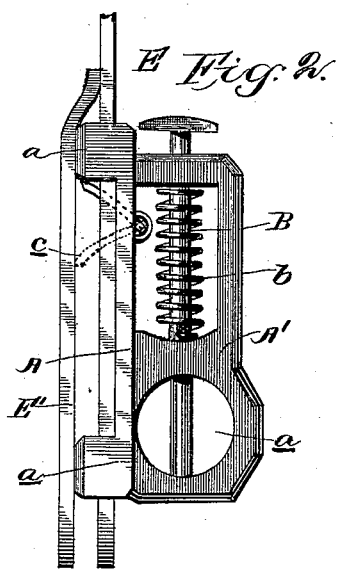
Figure 3:
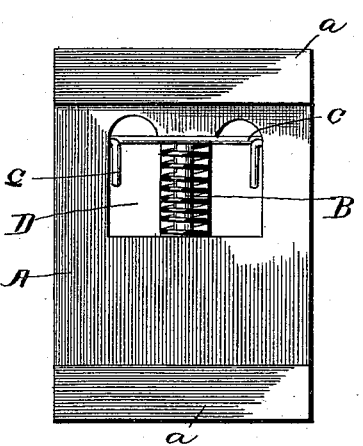

Figure 1 is a front view of the device, showing the application of the same. Fig. 2 is a side view, and Fig. 3 is a reverse or back view.

The device comprises a base-plate, A, having loops $a$ projecting from its rear at each end, and a double loop, A', extending from its face at right angles to the loops $a$, a keeper, B, extended and working through the double loop, and a cross-bar, C, provided with prongs or tongues $c$. The keeper is passed loosely through the double loop, and a spring, $b$, surrounding the upper portion, is confined between the upper bar of the loop and a stop or pin on the keeper. By this construction the lower portion of the keeper is normally kept projected across the lower loop, $a$. A portion of the plate near the upper end is removed, forming the opening D. Apertured lugs projecting from the face and located on each side of the opening form bearings for the cross-bar C, which is journaled therein. The ends of the cross-bar are folded parallel with the main portion for a short distance and are bent outward, forming the prongs or tongues $c$, which extend through opening D and act in opposition to the upper loop for engaging with the end of the back-strap E, to which it is secured. The end of the back-strap is passed through the loops. A flap or short strap, E', secured to the back-strap, overlaps the rear of the plate and prevents the loops striking the sides of the animal.

In practice the strap E is thrown over the back of the animal and a carrier is secured to each end. The trace F is passed through the lower loop, $a$, and engaged by the keeper. By this means the traces are supported and the back-band is held in position. The carrier can be adjusted up and down upon the strap, to hold the trace at any desired position, as will be readily appreciated.

Having thus described my invention, what I claim, and desire to secure by Letters Patent, is—

The herein shown and described device for the purposes set forth, consisting of a plate provided with an opening, and having loops on its rear and a double loop on its front arranged at right angles to the loops on the rear, a keeper passed loosely through the double loop, a spring mounted on the keeper for holding it normally projected across the lower loop, apertured lugs located on each side of the opening, and a cross-bar mounted in the lugs, and having prongs or tongues extending therefrom and projecting through the opening in the plate, substantially as and for the purpose set forth.

In testimony whereof I affix my signature in presence of two witnesses.

DAVID RODOLPH COTNER.

Witnesses:
W. S. HARRIS,
W. C. HENDRICKS.